(12) United States Patent
Nobiki et al.

(10) Patent No.: US 7,760,522 B2
(45) Date of Patent: Jul. 20, 2010

(54) CONTROL UNIT FOR CONTROLLING DC/DC CONVERTER, DC/DC CONVERTER, ELECTRIC APPARATUS, AND APPARATUS HAVING SUPPLY CIRCUIT

(75) Inventors: Taku Nobiki, Kawasaki (JP); Takahiro Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 767 days.

(21) Appl. No.: 11/638,696

(22) Filed: Dec. 14, 2006

(65) Prior Publication Data

US 2007/0145913 A1   Jun. 28, 2007

Related U.S. Application Data

(63) Continuation-in-part of application No. 11/362,840, filed on Feb. 28, 2006, now abandoned.

(30) Foreign Application Priority Data

Dec. 16, 2005 (JP) ............................. 2005-363716
Nov. 30, 2006 (JP) ............................. 2006-323559

(51) Int. Cl.
*H02M 3/335* (2006.01)
(52) U.S. Cl. ............... 363/25; 363/23; 363/21.12; 363/74; 323/228; 323/242; 323/243; 323/271; 315/247; 315/291

(58) Field of Classification Search ................... 363/16, 363/17, 21.01, 21.04, 21.12, 23, 25, 31, 74, 363/123, 131; 323/224, 228, 242, 243, 281–284, 323/271, 288, 351; 315/247, 291, 224, 307, 315/209 R
See application file for complete search history.

(56) References Cited

U.S. PATENT DOCUMENTS

| | | | |
|---|---|---|---|
| 5,508,903 A * | 4/1996 | Alexndrov | 363/16 |
| 6,204,651 B1 * | 3/2001 | Marcus et al. | 323/283 |
| 7,075,280 B2 * | 7/2006 | May | 323/284 |

FOREIGN PATENT DOCUMENTS

| | | |
|---|---|---|
| JP | 2001-231251 | 8/2001 |
| JP | 2002-51540 | 2/2002 |
| JP | 2005-6402 | 1/2005 |

* cited by examiner

*Primary Examiner*—Haissa Philogene
(74) *Attorney, Agent, or Firm*—Kratz, Quintos & Hanson, LLP

(57) ABSTRACT

The present invention is intended to prevent the flow of a large input current into a DC/DC converter, to which power is fed from a power supply, before a supply voltage delivered from the power supply reaches a rated output voltage. A control unit included in the DC/DC converter includes a steady state detection block that detects a condition in which an input voltage to be applied to the DC/DC converter has been stabilized, and inhibits the power feed from the DC/DC converter until the input voltage delivered from a power supply in a preceding stage is stabilized.

14 Claims, 13 Drawing Sheets

PRIOR ART

CONTROL UNIT FOR CONTROLLING DC/DC CONVERTER, DC/DC CONVERTER, ELECTRIC APPARATUS, AND APPARATUS HAVING SUPPLY CIRCUIT

CROSS-REFERENCE TO RELATED APPLICATION

This application is a continuation-in-part application of Ser. No. 11/362,840 filed on Feb. 28, 2006 now abandoned.

This application is based upon and claims the benefit of priority from the prior Japanese Patent Applications No. 2005-363716, filed on Dec. 16, 2005, and No. 2006-323559, filed on Nov. 30, 2006, the entire contents of which are incorporated herein by reference.

BACKGROUND OF THE INVENTION

1. Field of the Invention

The present invention relates to a control unit for controlling a DC/DC converter and a DC/DC converter including the control circuit. More particularly, the present invention is concerned with a start control method for a non-isolated DC/DC converter that is applied to a power feed circuit that feeds power to a load from a non-isolated DC/DC converter, which is realized with a compact non-isolated on-board power supply or the like, disposed near the load so as to prevent a voltage drop caused by a wiring resistance.

2. Description of the Related Art

In recent years, a power feed circuit that feeds power by a compact non-isolated on-board power supply disposed near a load so as to cope with a voltage drop caused by a wiring resistance, included in order to lower an operating voltage, has generally prevailed. FIG. 1 shows an example of a power feed circuit including a non-isolated on-board power supply.

As shown in FIG. 1, an isolated power supply 1 transforms a primary voltage such as a mains voltage while insulating a primary side from a secondary side, and then supplies dc power to each of non-isolated on-board power supplies 10a to 10c. The non-isolated on-board power supplies 10a to 10c convert the dc power fed from the isolated power supply 1 into dc power of a desired voltage, and feed the dc power to loads 2a to 2c connected to the respective on-board power supplies. Hereinafter, the non-isolated on-board power supplies 10a to 10c may generically be called a non-isolated on-board power supply 10. Likewise, the loads 2a to 2c may generically be called a load 2.

A DC/DC converter exemplified by the non-isolated on-board power supply in this specification is a power conversion circuit. In general, as long as an output power remains constant, an input voltage and an input current are inversely proportional to each other. FIG. 2 shows the relationship between the input voltage and input current. In FIG. 2, supposing that the non-isolated on-board power supply 10 feeds constant power, an input current Ii flowing from the isolated power supply 1 is inversely proportional to an input voltage Vi of the non-isolated on-board power supply 10. Therefore, if the output voltage of the isolated power supply 1 to be applied to the non-isolated on-board power supply 10 is a voltage V1 lower than a rated output voltage Vsr, a current I1 larger than an intended input current I2 flows into the non-isolated on-board power supply 10.

The foregoing property of the non-isolated on-board power supply 10 poses the problem described below. Namely, if a voltage rise, occurring when the isolated power supply 1 in a preceding stage initiates a power feed is moderate by reason of a large electrostatic capacity of a load imposed on the isolated power supply 1, before the voltage reaches the rated output voltage Vsr, the non-isolated on-board power supply 10 starts to receive a large current. As a result, a protective fuse may be melted or the isolated power supply 1 in the preceding stage may halt due to an overload. Referring to FIG. 3, this mechanism will be described below.

The first to fourth timing charts included in FIG. 3 indicate time-varying changes in an input voltage Vi, an input current Ii, an output voltage Vo, and an output current Io of the non-isolated on-board power supply 10. As seen from the first timing chart of the FIG. 3, the isolated power supply 1 initiates the power feed to the non-isolated on-board power supply 10 at a time instant t0. The output voltage of the isolated power supply 1 gradually rises until it reaches the rated output voltage Vsr at a time instant t2.

When the output voltage Vs of the isolated power supply 1 gradually rises, the non-isolated on-board power supply 10 starts with a starting voltage Via lower than the rated output voltage Vsr (time instant t1). As seen from the second timing chart of FIG. 3, a current I1 much larger than an input current I2 that flows with application of the rated output voltage Vsr flows into the non-isolated on-board power supply 10.

In efforts to solve the foregoing problem, a circuit for monitoring an input voltage as shown in FIG. 4 is conventionally included for restricting the input voltage Vi that causes an non-isolated on-board power supply to start. Specifically, voltage divider resistors R1 and R2 are used to produce a fraction of the input voltage Vi, and the fractional voltage is compared with a constant voltage Vc serving as a reference in order to turn on or off a switching element drive circuit 11. If a threshold for the input voltage Vi with which the switching element drive circuit 11 is turned on or off is set to a value near a rated voltage, production of a large current occurring at the start of the power supply 1 in the preceding stage can be prevented.

SUMMARY OF THE INVENTION

However, an input voltage of a non-isolated on-board power supply has tended to be diversified in recent years. This reflects various requirements. Namely, a wide range of input voltages is required in order to: improve efficiency in supply or reduce a cost by classifying commodities into groups associated with diverse input voltages; cope with a change in a voltage drop on wiring occurring when a power level is increased; and utilize an inexpensive isolated power supply whose output is low in precision.

Assuming that the non-isolated on-board power supply 10 is designed to operate at a voltage ranging, for example, from 3.0 V to 6.0 V, as far as an example of conventional circuitry shown in FIG. 4 is concerned, a threshold to be used to monitor an input voltage must be set to a voltage (for example, 2.8 V) lower than the lower limit of the range of operating voltages.

A supply voltage delivered from the isolated power supply 1 in a steady state is set to a voltage (for example, 6.0 V) near the upper limit of a range of input voltages permissible for the non-isolated on-board power supply 10, and the non-isolated on-board power supply 10 is put to use. In this case, after the non-isolated on-board power supply 10 is started, when an input voltage reaches 2.8 V, an input current that is twice or more larger than a current flowing with application of a rated voltage (6.0 V) flows into the non-isolated on-board power supply. Similarly to the case described with reference to FIG. 3, a large current may flow when the power supply is started.

Accordingly, an object of the present invention is to prevent the flow of a large input current into a DC/DC converter, to which power is fed from a power supply, before a supply voltage delivered from the power supply reaches a rated output voltage.

In order to accomplish the above object, the present invention controls an output of a DC/DC converter by detecting a condition in which an input voltage has reached a steady-state value but does not monitor an input voltage by comparing the input voltage with a constant voltage.

According to the first aspect of the present invention, there is provided a DC/DC converter control unit that includes a steady state detection block which detects a condition in which an input voltage to be applied to a DC/DC converter has been stabilized, and that inhibits the power feed from the DC/DC converter until the input voltage becomes stable.

The steady state detection block detects a condition in which an input voltage applied to a DC/DC converter has been stabilized after rising and which is observed, for example, when the power feed to the DC/DC converter is initiated.

Furthermore, the control unit in accordance with the present invention may include an input voltage detection block that detects an input voltage applied to the DC/DC converter. Moreover, the steady state detection block may include a reference voltage generator that generates a reference voltage whose rise lags behind the rise of the input voltage. The steady state detection block may compare a detected voltage with the reference voltage so as to detect a condition in which the input voltage has been stabilized.

The reference voltage generator may be realized with a ramp circuit that generates a ramp voltage which rises at a slope smaller than a slope at which an input voltage rises. The reference voltage generator may be realized with a time constant circuit that produces a signal which follows the input voltage.

Moreover, the control unit having the foregoing features may be incorporated in a DC/DC converter that is an object of control or may be external to the DC/DC converter that is an object of control.

According to the second aspect of the present invention, there is provided an electric apparatus that is supplied with dc power and performs a predetermined action. The electric apparatus includes a reference voltage generator that generates a reference voltage whose rise lags behind the rise of an input voltage of dc power, and a comparator that compares the input voltage with the reference voltage. Based on the result of comparison performed by the comparator, the electric apparatus detects the fact that the input voltage has become steady-state.

According to the third aspect of the present invention, there is provided an apparatus having a supply circuit. Herein, a power supply includes a reference voltage generator that generates a reference voltage whose rise lags behind the rise of an input voltage developed with dc power, and a comparator that compares the input voltage with the reference voltage. When the fact that the input voltage has become steady-state is detected based on the result of comparison performed by the comparator, the feed of power transformed from the dc power is initiated.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 6:
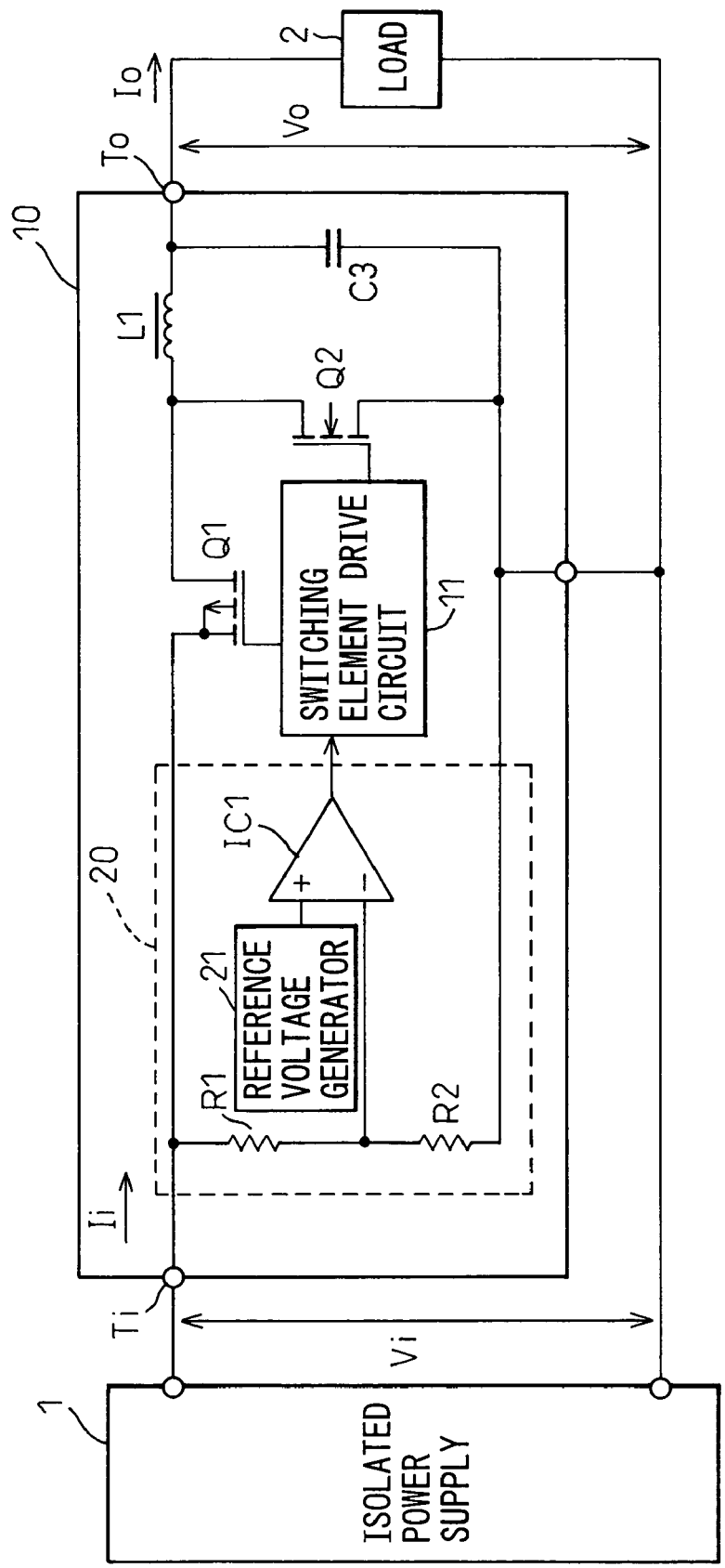
FIG. 6 shows the outline configuration of a non-isolated on-board power supply in accordance with an embodiment of the present invention.

Preferred embodiments of the present invention will be described in detail below while referring to the attached figures. FIG. 6 shows the outline configuration of a non-isolated on-board power supply in accordance with an embodiment of the present invention.

An isolated power supply 1 that transforms a primary voltage such as a mains voltage while insulating a primary side from a secondary side feeds dc power to a non-isolated on-board power supply 10. The non-isolated on-board power supply 10 converts the dc power into dc power of a predetermined voltage, and feeds the dc power to a load 2.

The non-isolated on-board power supply 10 includes switching elements Q1 and Q2, a switching element drive circuit 11 that turns on or off the switching elements alternately, and a smoothing LC filter composed of an inductor L1 and a capacitor C3. The switching element drive circuit 11 can adjust an output voltage Vo by varying a ratio of a time during which the switching element Q1 is on or off to a time during which the switching element Q2 is on or off. Specifically, the ratio of a time during which the switching element Q1 interposed between an output terminal To and an input terminal Ti is on to a time during which the switching element Q2 interposed between the output terminal To and a ground is on is adjusted in order to control the output voltage Vo so that the output voltage Vo will assume a certain desired value. An ac voltage stemming from the on-off control is smoothed by the smoothing LC filter composed of the inductor L1 and capacitor C3, whereby a dc voltage Vo is generated.

Furthermore, the non-isolated on-board power supply 10 includes a control circuit 20 having voltage divider resistors R1 and R2 that produce a fraction of an input voltage Vi proportional to the ratio of two resistances, a reference voltage generator 21 that generates a reference voltage Vr which is characterized by a rise which lags behind a rise of the input voltage Vi occurring when the isolated power supply 1 initiates power feed, and a comparator IC1 that compares a voltage Vd (=Vi×R2/(R1+R2)) produced by the voltage divider resistors R1 and R2 with the reference voltage Vr.

When the reference voltage Vr exceeds the detected voltage Vd, the comparator IC1 transmits an on-board power supply start signal, which permits the on-off control of the switching elements Q1 and Q2 and causes the non-isolated on-board power supply 10 to deliver the dc voltage Vo to the switching element drive circuit 11.

As mentioned above, the reference voltage generator 21 and comparator IC1 detect a condition in which the reference voltage Vr whose rise lags behind the rise of the input voltage Vi has exceeded the detected voltage Vd, and thus detect a condition in which the rise of the input voltage Vi has ceased and the input voltage Vi has become steady-state (stable). Therefore, the reference voltage generator 21 and comparator IC1 correspond a steady state detection block in the present invention.

Moreover, the control circuit 20 uses the reference voltage generator 21 and comparator IC1 to inhibit the power feed from the non-isolated on-board power supply 10 until the input voltage Vi is stabilized. Therefore, the control circuit 20 corresponds to a control unit in the present invention.

Figure 7:
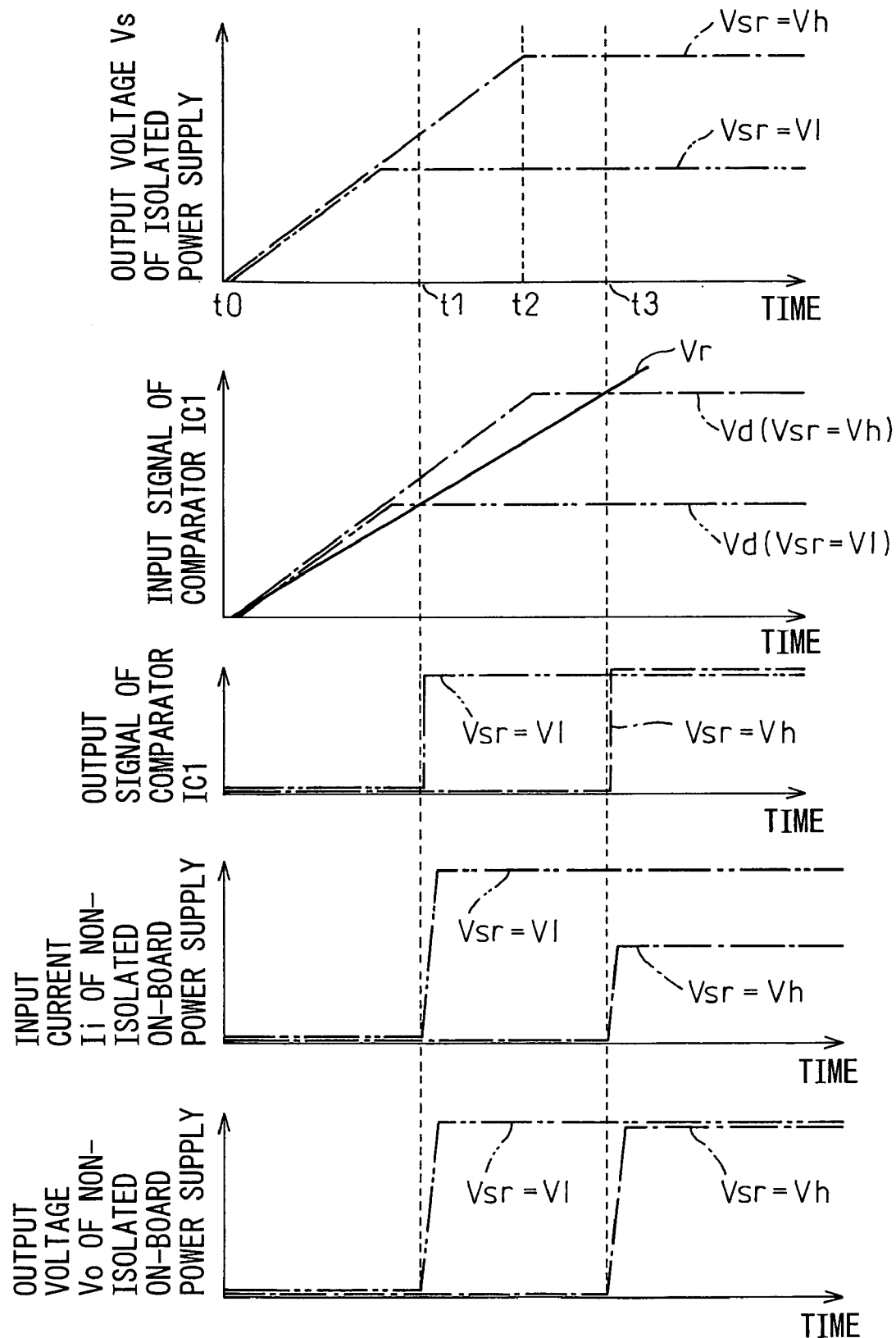
FIG. 7 includes timing charts showing a voltage and a current observed at each of circuit elements in a case where the non-isolated on-board power supply shown in FIG. 6 is operated at two input voltages.

FIG. 7 includes timing charts indicating a voltage and a current observed at each of the components of the non-isolated on-board power supply 10. The first timing chart included in FIG. 7 indicates an output voltage Vs of the isolated power supply 1 (that is, an input voltage Vi of the non-isolated on-board power supply 10). The second timing chart indicates an input signal of the comparator IC1 (that is, a reference voltage Vr and a detected voltage Vd). The third timing chart indicates an output signal of the comparator IC1 (that is, an on-board power supply start signal), and the fourth and fifth timing charts indicate an input current Ii and an output voltage Vo of the non-isolated on-board power supply 10.

The timing charts of FIG. 7 show a case where the isolated power supply 1 delivers two different voltages of a relatively high voltage Vh and a relatively low voltage Vl as a rated output voltage Vsr. A dot-dash line is concerned with a case where the relatively high voltage Vh is delivered as the rated output voltage Vsr, while an alternate long and two short dashes line is concerned with a case where the relatively low voltage Vl is delivered as the rated output voltage Vsr.

In the second timing chart of FIG. 7, a dot-dash line indicates the voltage Vd detected in the case where the relatively high voltage Vh is delivered as the rated output voltage Vsr, while an alternate long and two short dashes line indicates the voltage Vd detected in the case where the relatively low voltage Vl is delivered as the rated output voltage Vsr. A solid line indicates the reference voltage Vr.

As seen from the first timing chart of FIG. 7, after the isolated power supply 1 initiates power feed at a time instant t0, the output voltage gradually rises, as the elapse, from the time instant t0 to a time instant t2. Consequently, the detected voltage Vd that is a fraction of the input voltage Vi corresponding to the output voltage Vs which is produced by the voltage divider resistors R1 and R2 rises gradually as shown in the second timing chart of FIG. 7.

The reference voltage Vr generated by the reference voltage generator 21 and applied to the comparator IC1 is characterized by a rise that lags behind the rise of the output voltage Vs (that is, the input voltage Vi of the non-isolated on-board power supply 10) occurring when the isolated power supply 1 is started.

In the case indicated by the second timing chart of FIG. 7, for example, the reference voltage Vr rises at a slope smaller than a slop (that is, a rise rate) at which the output voltage Vs rises with the start of the isolated power supply 1. Specifically, the reference voltage Vr rises at a slope smaller than a slope at which the detected voltage Vd that is a fraction of the input voltage Vi of the non-isolated on-board power supply 10 rises.

Consequently, when the isolated power supply 1 is started, the rise of the reference voltage Vr lags, as indicated by the second timing chart of FIG. 7, behind the rise of the detected voltage Vd. When the isolated power supply 1 is started, the detected voltage Vd is always higher than the reference voltage Vr. Meanwhile, the comparator IC1 suspends transmission of an on-board power supply start signal to the switching element drive circuit 11, whereby the power feed from the non-isolated on-board power supply 10 is inhibited.

When the voltage Vs delivered from the isolated power supply 1 reaches a steady-state value at a time instant t3, the reference voltage Vr finally matches the detected voltage Vd. The magnitude relationship between the voltages Vd and Vr is reversed. At this time, the comparator IC1 transmits an on-board power supply start signal to the switching element drive circuit 11 so that the power feed from the non-isolated on-board power supply 10 will be initiated (refer to the fifth timing chart of FIG. 7).

As is apparent from the second timing chart of FIG. 7, whichever of the relatively high voltage Vh and relatively low voltage Vl is adopted as the output rated voltage Vsr to be delivered from the isolated power supply 1, the reference voltage Vr does not match the detected voltage Vd until the output voltage Vs of the isolated power supply 1 becomes steady-state and stable. Consequently, the non-isolated on-board power supply 10 starts irrespective of a difference between employed input voltages after an input voltage becomes steady-state. Eventually, a flow of an excessive current as an input current can be prevented.

Incidentally, the reference voltage generator 21 has been described as generating the reference voltage Vr that rises at a slope smaller than a slope (that is, a rise rate) at which the output voltage Vs rises with the start of the isolated power supply 1. Specifically, the reference voltage generator 21 generates the reference voltage Vr that rises at a slope smaller than a slope at which the detected voltage Vd, which is a fraction of the input voltage Vi of the non-isolated on-board power supply 10, rises.

Figure 8:
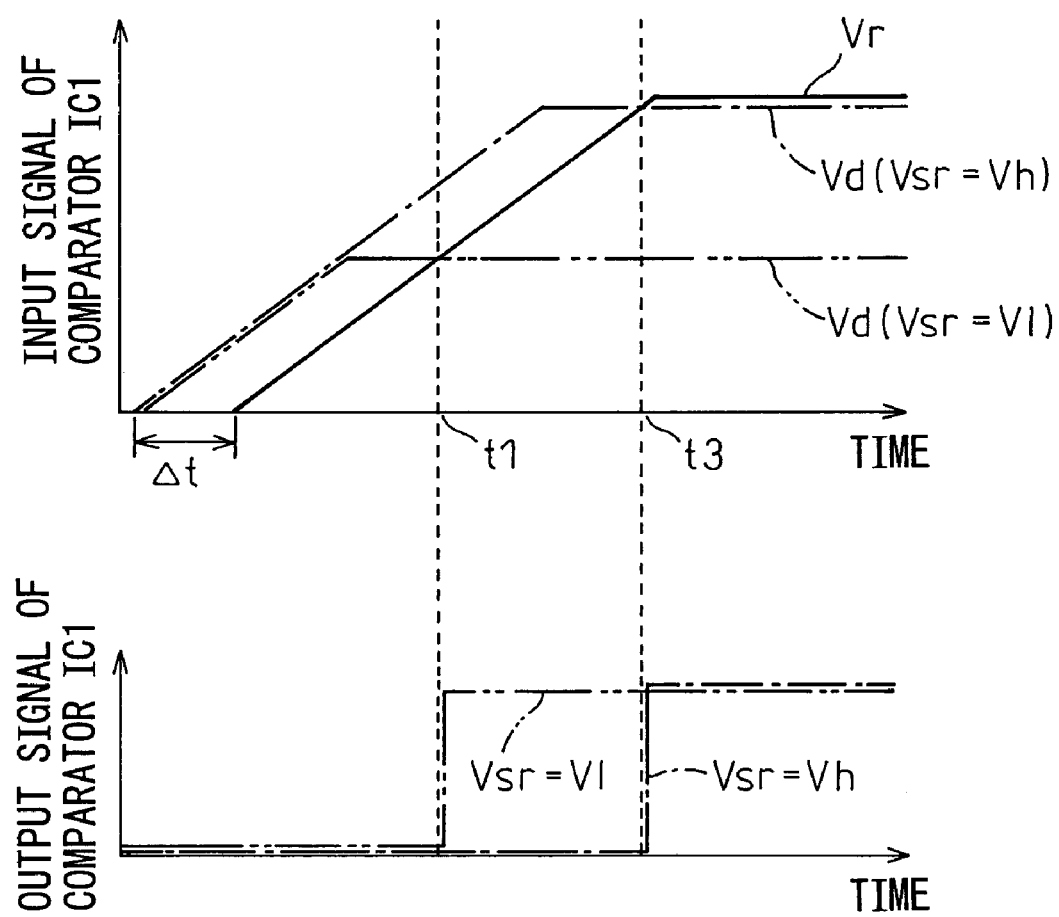
FIG. 8 includes timing charts showing the second example of a reference voltage.

Alternatively or additionally, the reference voltage generator 21 may generate a reference voltage Vr whose rise lags behind the rise of the output voltage Vs, which occurs when the isolated power supply 1 is started, by a predetermined delay time Δt. Specifically, the reference voltage generator 21 may generate the reference voltage Vr that rises at a time instant which comes later than a time instant when the output voltage Vs rises with the start of the isolated power supply 1. FIG. 8 shows the second example of the reference voltage Vr.

The upper timing chart included in FIG. 8 indicates the second example of the reference voltage Vr (solid line), a detected voltage Vd (dot-dash line) that is a fraction of a input voltage Vi in the case of a relatively high rated output voltage Vh, and a detected voltage Vd (alternate long and two short dashes line) that is a fraction of a input voltage Vi in the case of a relatively low rated output voltage V1. The lower timing chart included in FIG. 8 indicates an output signal of the comparator IC1 (that is, an on-board power supply start signal).

As shown in the upper timing chart of FIG. 8, the reference voltage generator 21 generates the reference voltage Vr that rises at a time instant that comes later than a time instant, when the output voltage Vs rises with the start of the isolated power supply 1, by a predetermined delay time Δt.

Even when the reference voltage Vr is generated as mentioned above, whichever of the relatively high voltage Vh and relatively low voltage V1 is adopted as the output rated voltage Vsr to be delivered by the isolated power supply 1, the reference voltage Vr does not catch up with the detected voltage Vd until the output voltage Vs of the isolated power supply 1 becomes steady-state and stable. Consequently, the non-isolated on-board power supply 10 can be started irrespective of a difference between input voltages to be employed after an input voltage becomes steady-state.

In FIG. 8, the reference voltage Vr rises at a slope identical to a slope at which the detected voltage Vd rises. Alternatively, the reference voltage Vr may rise at a slope smaller or slightly larger than a slope at which the detected voltage Vd rises. Consequently, as the reference voltage lags by the delay time Δt, the slope, at which the output voltage Vs of the isolated power supply 1 in the preceding stage rises, may vary within a certain range.

A person with ordinary skill in the art will find it easy to realize the reference voltage generator 21, which generates the reference voltage Vr that lags by the delay time Δt, using, for example, a digital circuit that includes a delay element which samples the detected voltage Vd at intervals of a predetermined sampling time and holds it during the delay time Δt.

As for the two examples of the reference voltage Vr, when the magnitude relationship between the voltages Vd and Vr is reversed, the comparator IC1 transmits an on-board power supply start signal to the switching element drive circuit 11. Alternatively or additionally, a comparing circuit may be configured such that the comparator IC1 may transmit the on-board power supply start signal to the switching element drive circuit 11 when the difference between the voltages Vd and Vr becomes equal to or smaller than a predetermined voltage difference.

Figure 9:
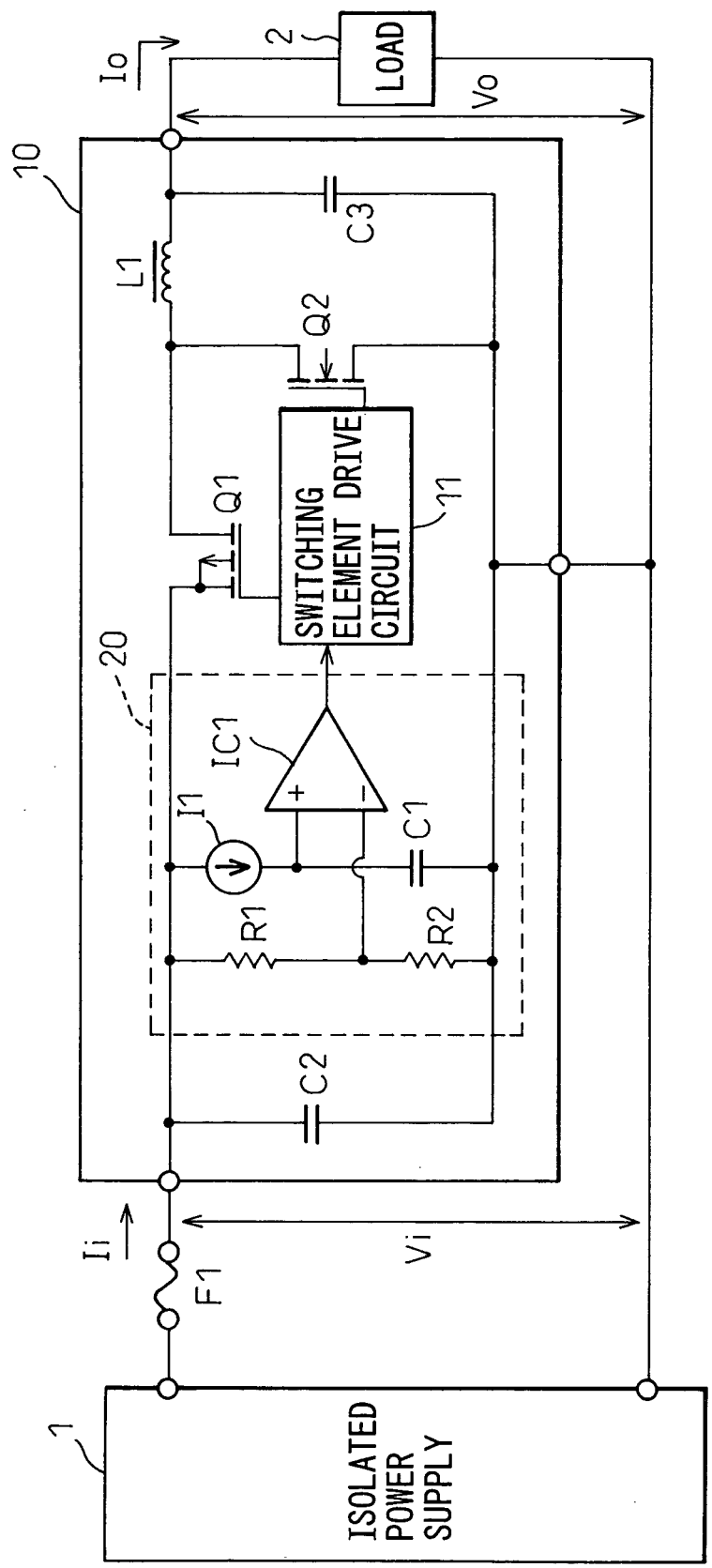
FIG. 9 shows the outline configuration of a non-isolated on-board power supply so as to present the first example of a reference voltage generator.
Figure 10:
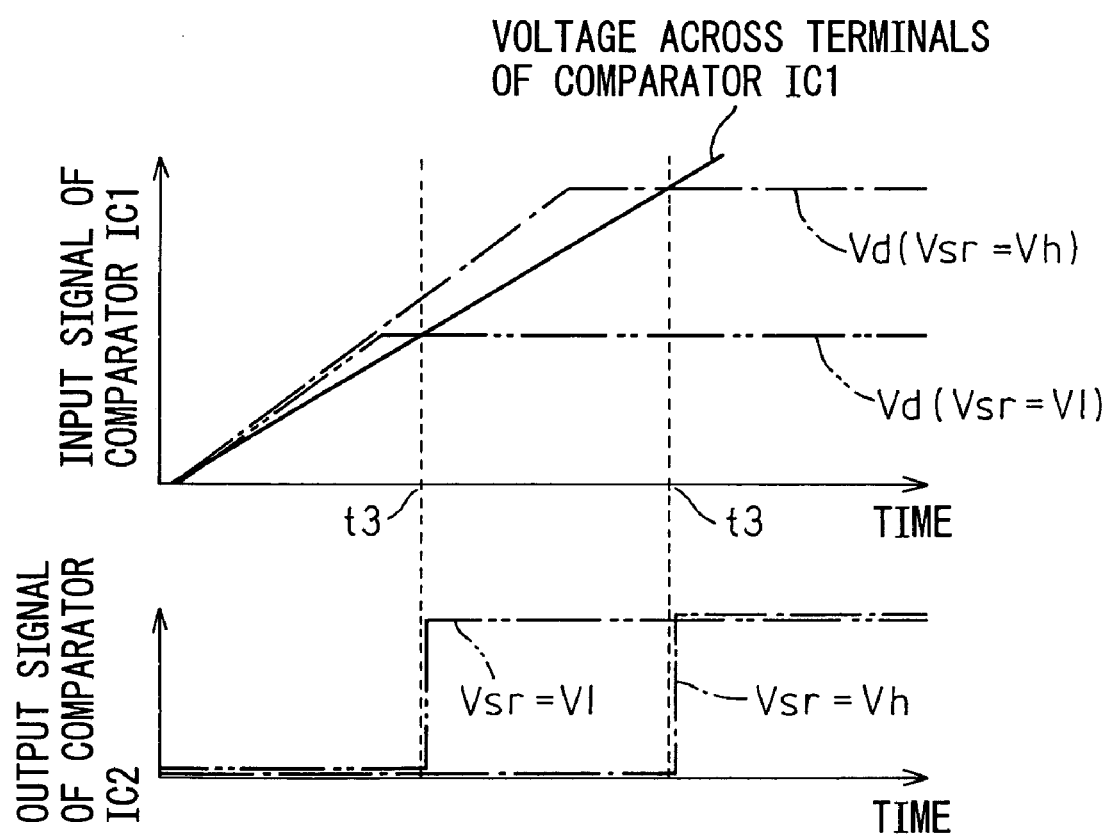
FIG. 10 includes timing charts showing a reference voltage generated by the reference voltage generator shown in FIG. 9.

FIG. 9 shows the outline configuration of a non-isolated on-board power supply so as to present the first example of the reference voltage generator. The control circuit 20 included in the non-isolated on-board power supply 10 includes a constant current circuit I1 that feeds a constant current, and a capacitor C1 that is charged at a certain rate with the current fed from the constant current circuit I1. The current fed from the constant current circuit I1 and the capacitance of the capacitor C1 are determined so that a slope at which the voltage across the terminals of the capacitor C1 to be charged by the constant current circuit I1 will be smaller than a slope at which the detected voltage Vd rises with the start of the isolated power supply 1. The voltage across the terminals of the capacitor C1 is adopted as the reference voltage Vr. The comparator IC1 compares the voltage across the terminals of the capacitor C1 with the detected voltage Vd that is a fraction of the input voltage Vi. FIG. 10 includes timing charts indicating the reference voltage Vr generated by the constant current circuit I1 and capacitor C1.

The upper timing chart included in FIG. 10 indicates the voltage across the terminals of the capacitor C1 (solid line) serving as the reference voltage Vr, the detected voltage Vd that is a fraction of an input voltage Vi in the case of the relatively high rated output voltage Vh (dot-dash line), and the detected voltage Vd (alternate long and two short dashes line) that is a fraction of an input voltage Vi in the case of the relatively low rated output voltage V1. Herein, these voltages are applied to the comparator IC1. The lower timing chart indicates the output signal of the comparator IC1 (on-board power supply start signal).

When the isolated power supply 1 initiates power feed, the detected voltage Vd rises as indicated in the upper timing chart of FIG. 10. As illustrated, a slope at which the voltage across the terminals of the capacitor C1 rises is smaller than a slope at which the detected voltage Vd rises. The detected voltage Vd is higher than the voltage across the terminals of the capacitor C1 until the output voltage Vs of the isolated power supply 1 becomes steady-state. Consequently, the transmission of the on-board power supply start signal to the switching element drive circuit 11 is suspended, and the power feed from the non-isolated on-board power supply 10 is inhibited. While the output voltage Vs of the isolated power supply 1 is rising, the non-isolated on-board power supply 10 is halted by the comparator IC1.

Thereafter, at a time instant t3, the rise of the output voltage Vs of the isolated power supply 1 is completed to assume a steady-state value. The rising voltage across the terminals of the capacitor C1 catches up with the detected voltage Vd, and the output of the comparator IC1 is reversed. Consequently, when the output voltage Vs of the isolated power supply 1 comes to assume the steady-state value, the non-isolated on-board power supply 10 is started by the comparator IC1. Thus, after the input voltage becomes constant, the non-isolated on-board power supply 10 is started. Therefore, an input current is retained at a constant value, and an inflow of a large current is prevented.

Figure 11:
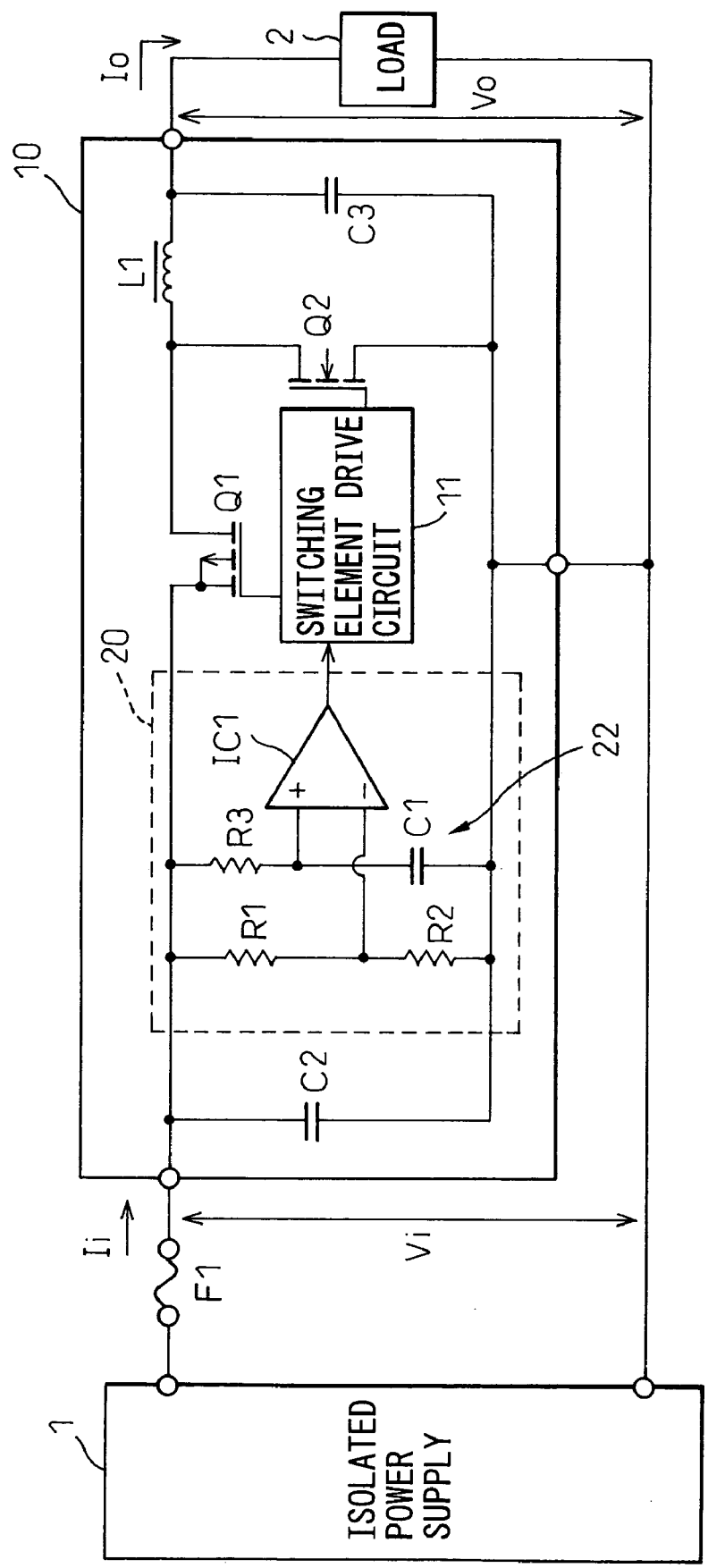
FIG. 11 shows the outline configuration of the non-isolated on-board power supply so as to present the second example of the reference voltage generator.

FIG. 11 shows the outline configuration of a non-isolated on-board power supply so as to present the second example of the reference voltage generator. A control circuit 20 included in a non-isolated on-board power supply 10 includes a time constant circuit 22 having a resistor R3 and a capacitor C1 connected in series with each other. An input voltage Vi is applied to nodes on both sides of the time constant circuit 22, and a voltage across the terminals of the capacitor C1 is adopted as a reference voltage Vr. The resistance of the resistor R3 and the capacitance of the capacitor C1 are determined so that a slope at which the voltage across the terminals of the capacitor C1 that is charged via the resistor R3 rises will be smaller than a slope at which a voltage Vd detected at the start of an isolated power supply 1 rises. A comparator IC1 compares the voltage across the terminals of the capacitor C1 with the detected voltage Vd that is a fraction of the input voltage Vi.

Figure 1:
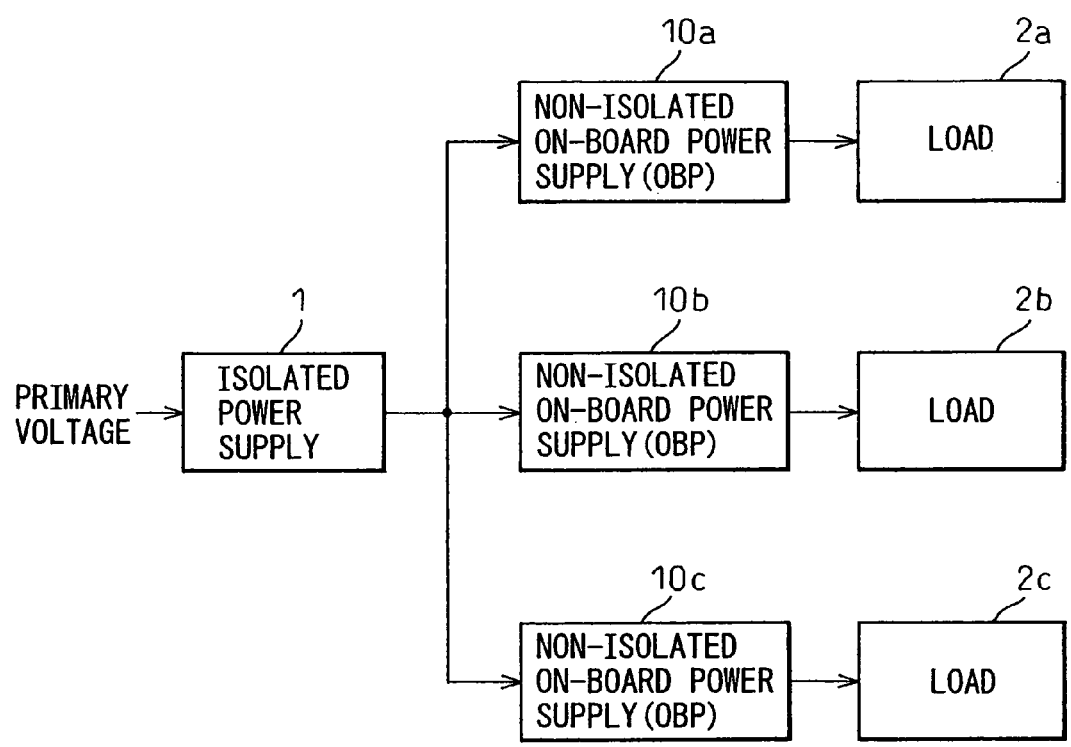
FIG. 1 shows an example of the circuitry of a power feed circuit including non-isolated on-board power supplies.
Figure 2:
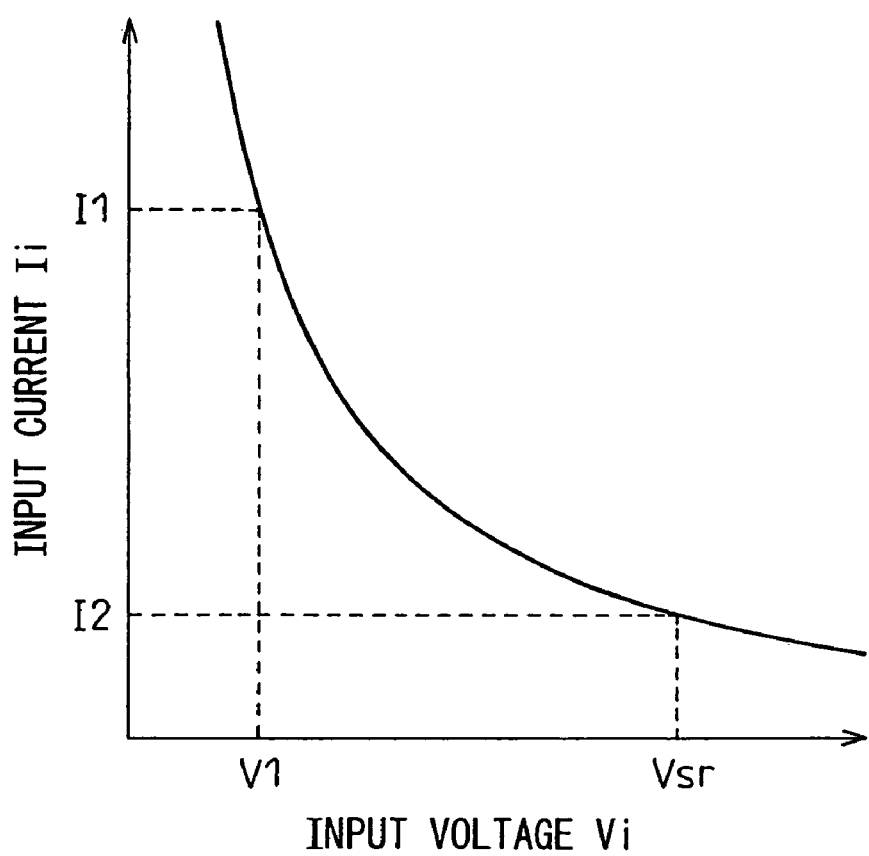
FIG. 2 is a graph indicating the relationship between an input voltage and an input current of a DC/DC converter that feeds constant output power.
Figure 3:
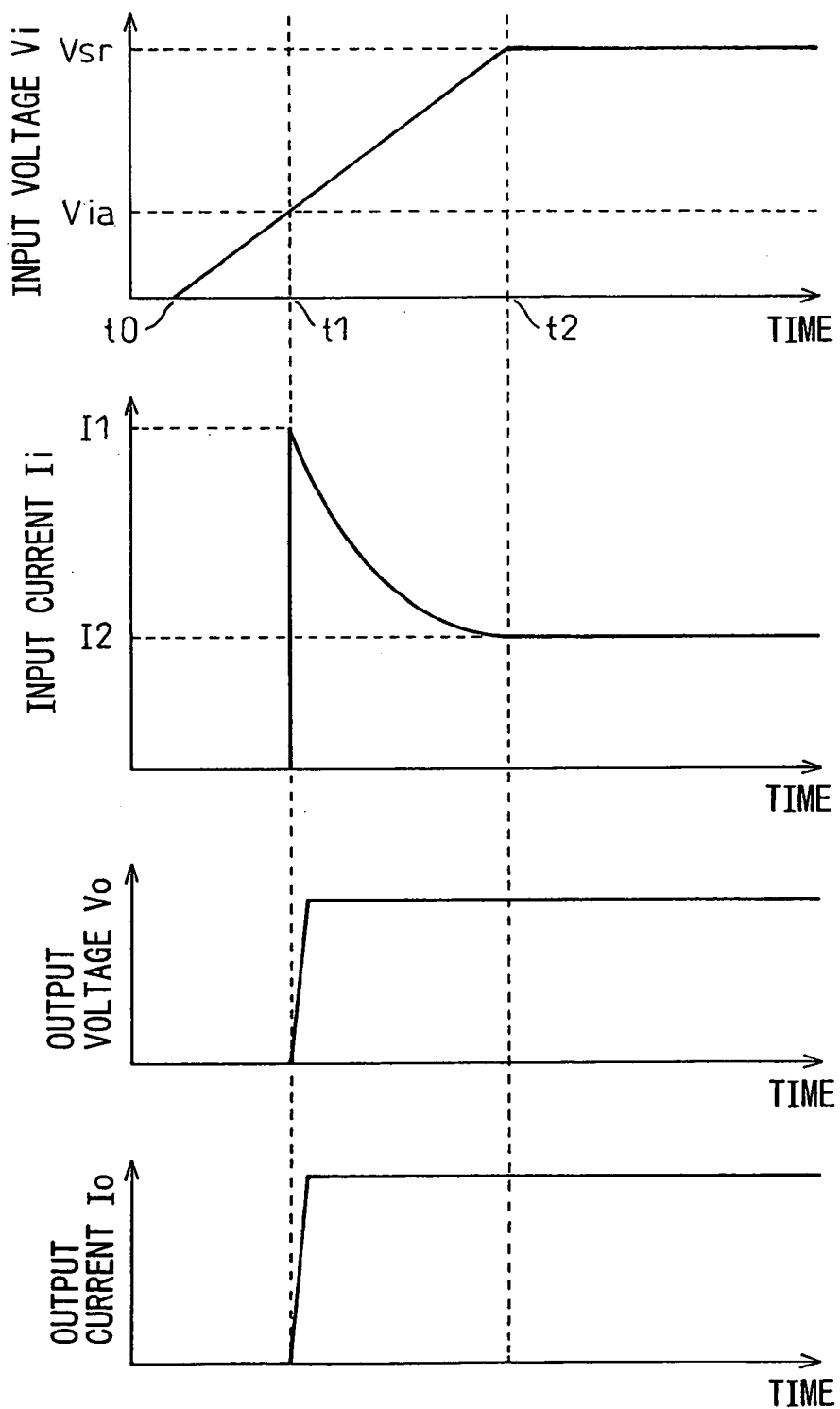
FIG. 3 includes timing charts for use in explaining the operation of a non-isolated on-board power supply in a case where a voltage rise is moderate when the power feed from an isolated power supply has been initiated.
Figure 4:
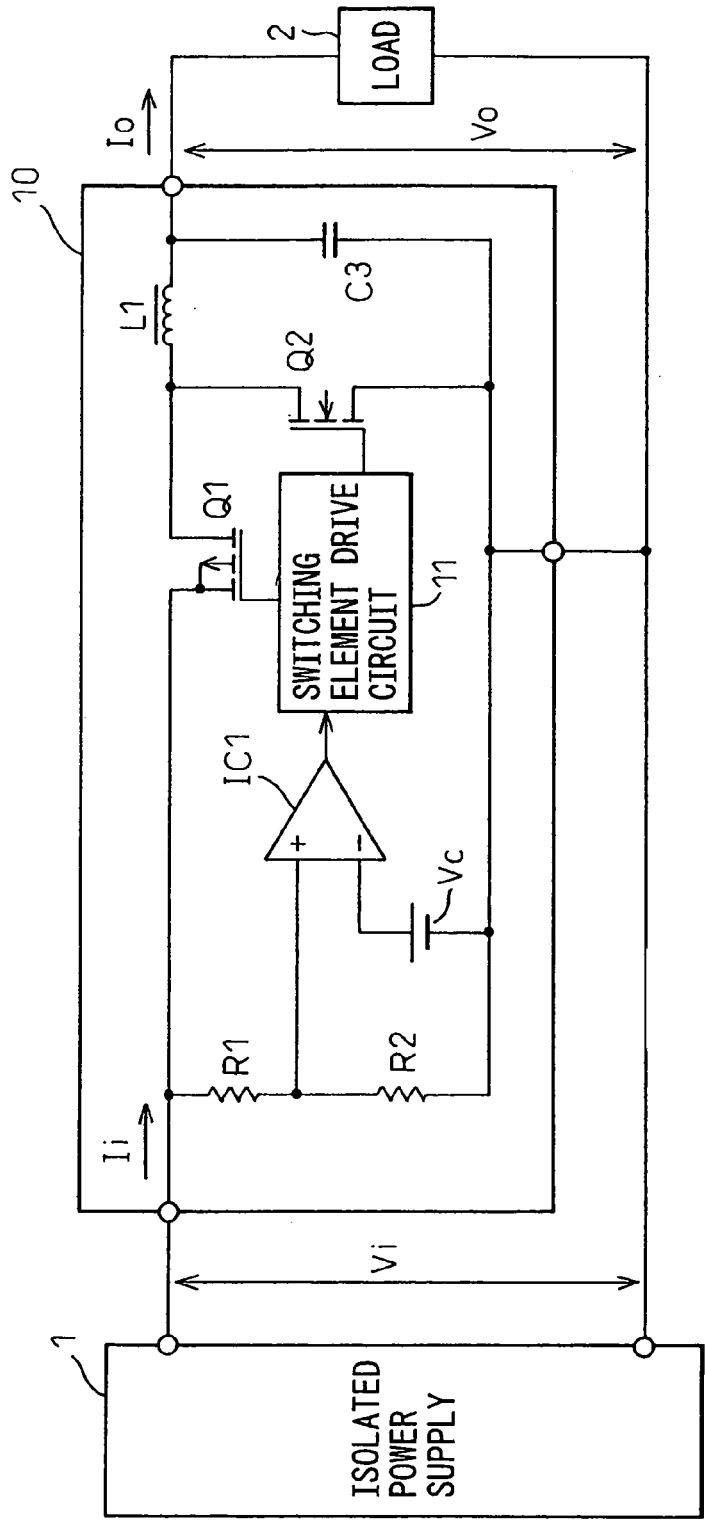
FIG. 4 shows the outline configuration of a conventional non-isolated on-board power supply.
Figure 5:
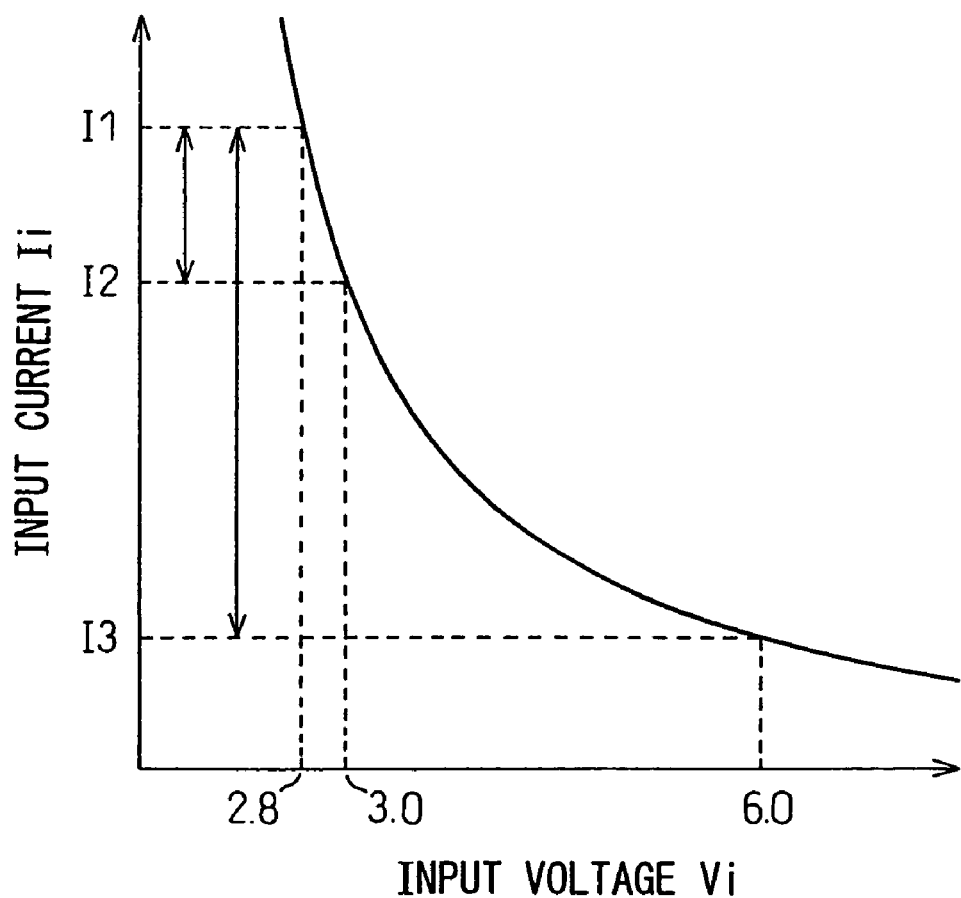
FIG. 5 is an explanatory diagram concerning a problem underlying the conventional non-isolated on-board power supply.
Figure 12:
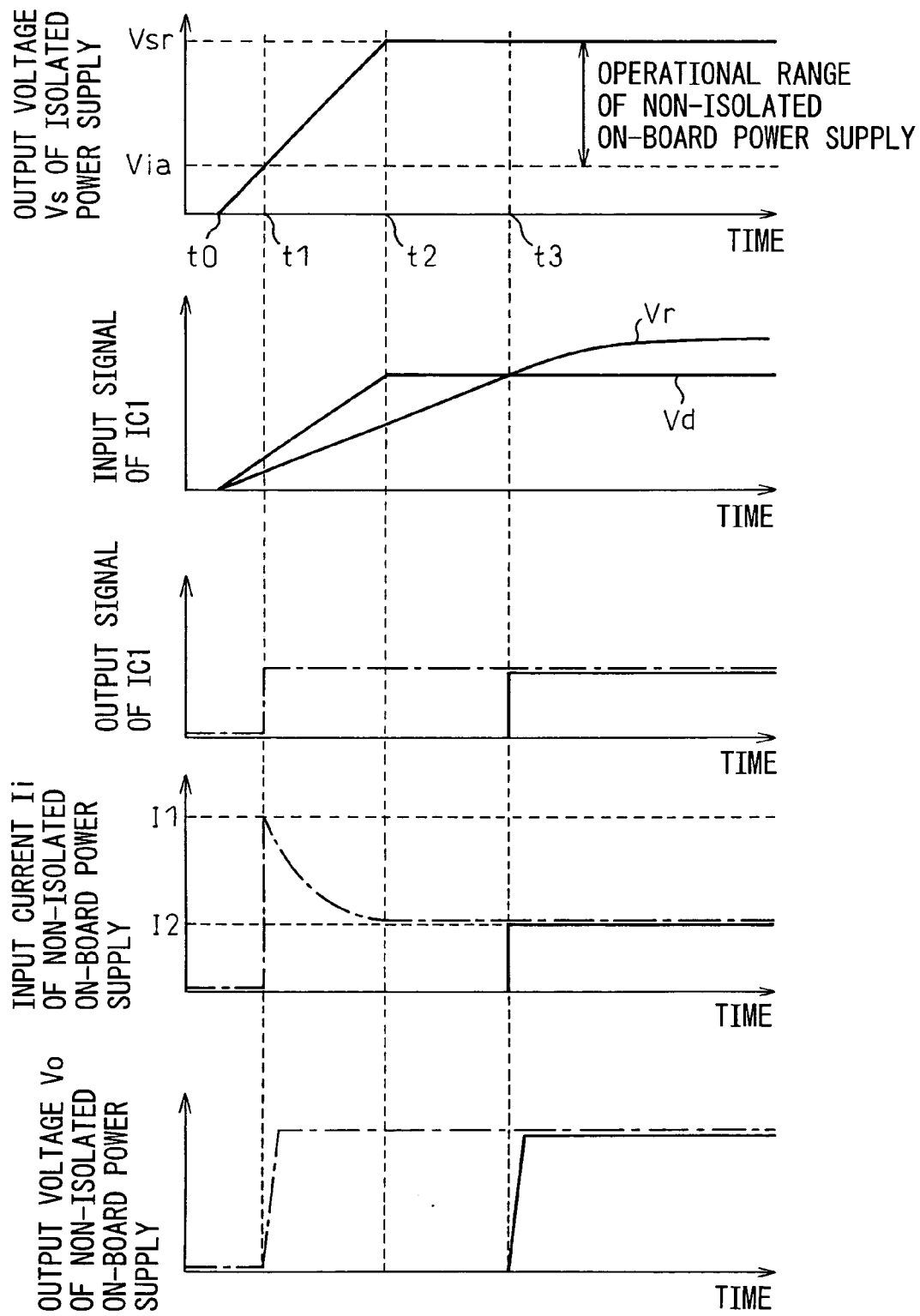
FIG. 12 includes timing charts of voltages and currents observed at respective components of the non-insolated on-board power supply shown in FIG. 11.

FIG. 12 includes timing charts of voltages and currents observed at components of the non-isolated on-board power supply shown in FIG. 11. The first timing chart of FIG. 12 shows an output voltage Vs of the isolated power supply 1. The second timing chart shows an input signal of the comparator IC1. The third timing chart shows an output signal of the comparator IC1. The fourth and fifth timing charts show an input current Ii of the non-isolated on-board power supply 10 and an output voltage Vo thereof respectively. In the third to fifth timing charts of FIG. 7, a solid line indicates values observed in the present example, while a dot-dash line indicates values observed in the conventional non-isolated on-board power supply that has been described with reference to FIG. 4.

Similarly to the timing charts of FIG. 7, after the isolated power supply 1 initiates power feed at a time instant t0, the output voltage Vs gradually rises along with the elapse of time from the time instant t0 to a time instant t2. Consequently, the detected voltage Vd that is a fraction of the input voltage Vi, which is the output voltage Vs, produced by voltage divider resistors and R2 also gradually rises as shown in the second timing chart of FIG. 12.

The reference voltage Vr that is produced by the time constant current 22 and transferred to the comparator IC1 is characterized by a rise that lags behind the rise of the output voltage Vs (that is, the input voltage Vi of the non-isolated on-board power supply 10) occurring at the start of the isolated power supply 1.

For example, in the case shown in the second timing chart of FIG. 12, the reference voltage Vr rises at a slope smaller than a slope (that is, a rising rate) at which the output voltage Vs rises at the start of the isolated power supply 1. More particularly, the reference voltage Vr rises at a slope smaller than the slope of the rise of the detected voltage Vd that is a fraction of the input voltage Vi of the non-isolated on-board power supply 10.

Consequently, when the isolated power supply 1 starts, the rise of the reference voltage Vr lags, as shown in the second timing chart of FIG. 12, behind the rise of the detected voltage Vd. When the isolated power supply 1 starts, the detected voltage Vd is always higher than the reference voltage Vr. Meanwhile, the comparator IC1 suspends the transmission of an on-board power supply start signal to a switching element drive circuit 11, whereby the power supply from the non-isolated on-board power supply 10 is inhibited.

When the output voltage Vs of the isolated power supply 1 reaches a steady-state value at a time instant t3, the reference voltage Vr catches up with the detected voltage Vd with a delay. The relationship between the voltages Vd and Vr is reversed. At this time, the comparator IC1 transmits an on-board power supply start signal to the switching element drive circuit 11. Consequently, the power feed from the non-isolated on-board power supply 10 is initiated (refer to the fifth timing chart of FIG. 12).

Consequently, as the non-isolated on-board power supply 10 does not start until the input voltage Vi becomes constant, an input current gets stabilized at a certain value. Therefore, inflow of a large current that occurs in the conventional non-isolated on-board power supply is prevented (refer to the fourth timing chart of FIG. 12). Moreover, even when a rated output voltage Vsr for the isolated power supply 1 is varied, the relationship between the voltages Vd and Vr is reversed after the output voltage Vs of the isolated power supply 1 reaches the steady-state value. The inflow of a large current can be prevented irrespective of the level of the rated output voltage Vsr.

Figure 13:
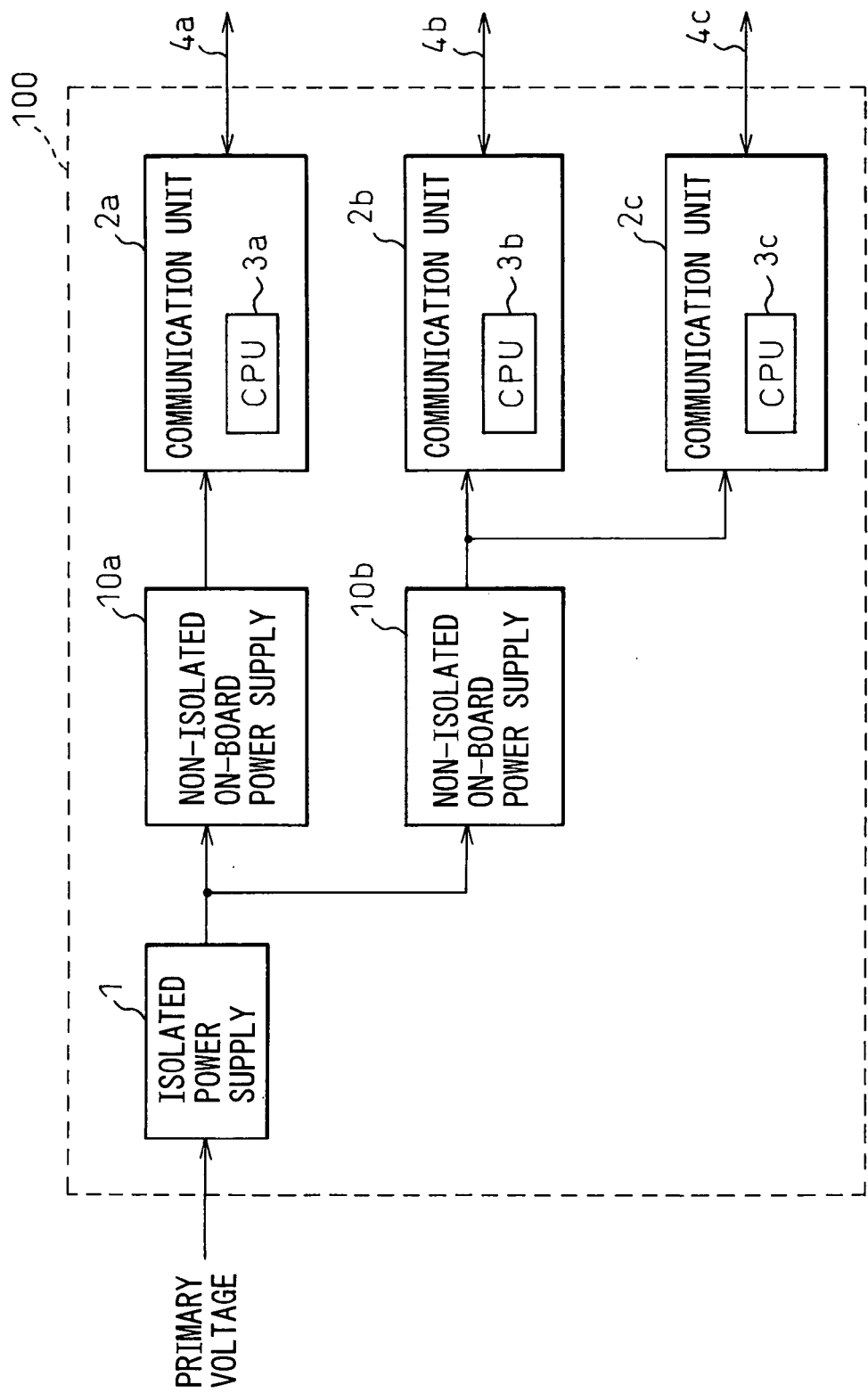
FIG. 13 shows the outline configuration of a communication apparatus including a non-isolated on-board power supply in accordance with the embodiment of the present invention.

The non-isolated on-board power supply employed in the present embodiment of the present invention can be incorporated in various apparatuses and put to use. As an example, FIG. 13 shows the outline configuration of a communication apparatus 100, which includes non-isolated on-board power supplies 10a and 10b identical to the non-isolated on-board power supply in accordance with the present embodiment.

The communication apparatus 100 includes communication units 2a to 2c that transfer a signal to or from other communication apparatus (not shown) over communication cables 4a to 4c respectively, non-isolated on-board power supplies 10a and 10b, and an isolated power supply 1.

The isolated power supply 1 transforms power of a primary voltage such as a mains voltage into dc power while isolating a primary side from a secondary side, and feeds the dc power to the non-isolated on-board power supplies 10a and 10b.

The non-isolated on-board power supplies 10a and 10b are realized with any of the non-isolated on-board power supplies in accordance with the embodiments of the present invention that have been described with reference to FIG. 6, FIG. 9, and FIG. 11 respectively. The non-isolated on-board power supplies 10a and 10b convert the dc power fed from the isolated power supply 1 into dc power of a predetermined voltage, and deliver the dc power to the communication units 2a to 2c that are regarded as a load. The power delivered from the non-isolated on-board power supplies 10a and 10b to the communication units 2a to 2c is consumed by electronic units incorporated in the respective units 2a to 2c, for example, CPUs 3a to 3c.

Incidentally, the communication apparatus 100 shown in FIG. 13 is an example of an apparatus in which the non-isolated on-board power supply 10 in accordance with the embodiment of the present invention is incorporated as a supply circuit. The present invention is not limited to this example. The non-isolated on-board power supply 10 in accordance with the present invention may be incorporated in, for example, an LSI device, an electronic circuit module, or a unit such as a computer or a server, and used as a supply circuit. Moreover, the non-isolated on-board power supply 10 is adopted as a supply circuit for electronic equipment or an electric apparatus that is mounted in a mobile object such as an automobile and that is used in the mobile object.

According to the present invention, a DC/DC converter does not start until the rise of a voltage delivered from a power supply in a preceding state which feeds power to the DC/DC converter being controlled is completed. Therefore, inflow of a large current will not occur. Consequently, melting of a protective fuse, stemming from inflow of a large current or halt of an isolated power supply in a preceding stage due to an overload, can be prevented.

In particular, even a DC/DC converter realized with a non-isolated on-board power supply that operates under a wide range of input voltages does not start until the rise of a voltage delivered from a power supply in a preceding stage is completed. Consequently, the inflow of a large current occurring at the time of the start of the DC/DC converter can be efficiently prevented.

The present invention can be adapted to each of a control circuit that controls a DC/DC converter and a DC/DC converter including the control circuit. In particular, the present invention can be adapted to a non-isolated DC/DC converter start control circuit and a non-isolated DC/DC converter, which are employed in a power feed circuit that feeds power by a non-isolated DC/DC converter which is realized with a compact non-isolated on-board power supply, disposed near a load so as to prevent a voltage drop caused by a wiring resistance.

While the invention has been described with reference to specific embodiments chosen for purpose of illustration, it should be apparent that numerous modifications could be made thereto by those skilled in the art without departing from the basic concept and scope of the invention.

What is claimed is:

1. A control unit for controlling a DC/DC converter, comprising a steady state detection block that detects a condition in which an input voltage to be applied to the DC/DC converter has been stabilized, wherein:

a power feed from the DC/DC converter is inhibited until the input voltage is stabilized.

2. The control unit according to claim 1, wherein the steady state detection block detects a condition in which the input voltage of the DC/DC converter has been stabilized after it rises.

3. The control unit according to claim 2, further comprising an input voltage detection block that detects the input voltage of the DC/DC converter, wherein:
the steady state detection block includes a reference voltage generator that generates a reference voltage whose rise lags behind the rise of the input voltage, and compares the detected voltage with the reference voltage so as to detect the condition in which the input voltage has been stabilized.

4. The control unit according to claim 3, wherein the reference voltage generator is realized with a ramp circuit that generates a ramp voltage which rises at a slope equal to or smaller than a slope at which the input voltage rises.

5. The control unit according to claim 3, wherein the reference voltage generator is realized with a time constant circuit that produces a signal which follows the input voltage.

6. A DC/DC converter including the control unit set forth in claim 1.

7. An electric apparatus that is supplied dc power and performs a predetermined action, comprising:
a reference voltage generator that produces a reference voltage whose rise lags behind the rise of an input voltage of the dc power; and
a comparator that compares the input voltage with the reference voltage, wherein:
the electric apparatus detects the fact that the input voltage has become steady-state based on the result of comparison performed by the comparator.

8. The electric apparatus according to claim 7, further comprising a supply circuit that converts the input voltage and feeds power to the electric apparatus, wherein:
the supply circuit detects the fact that the input voltage has become steady-state based on the result of comparison performed by the comparator.

9. The electric apparatus according to claim 8, wherein:
the supply circuit includes the reference voltage generator, the comparator, and a power conversion circuit; and
the power conversion circuit initiates feeding of power transformed from the dc power along with the detection of the fact that the input voltage has become steady-state.

10. The electric apparatus according to claim 7, wherein the reference voltage generator is a ramp circuit that produces a ramp voltage which rises at a slope equal to or smaller than a slope at which the input voltage rises.

11. The electric apparatus according to claim 7, wherein the reference voltage generator is a time constant circuit that produces a signal which follows the input voltage.

12. An apparatus having a supply circuit, wherein:
the supply circuit includes a reference voltage generator that generates a reference voltage whose rise lags behind the rise of an input voltage developed with dc power, and a comparator that compares the input voltage with the reference voltage;
the supply circuit initiates feeding of power transformed from the dc power along with a detection based on the result of comparison performed by the comparator of the fact that the input voltage has become steady-state.

13. The apparatus according to claim 12, wherein the reference voltage generator is a ramp circuit that produces a ramp voltage which rises at a slope equal to or smaller than a slope at which the input voltage rises.

14. The apparatus according to claim 12, wherein the reference voltage generator is a time constant circuit that produces a signal which follows the input voltage.

* * * * *